(12) United States Patent
    Fangman

(10) Patent No.: US 12,691,807 B1
(45) Date of Patent: Jul. 28, 2026

(54) BOAT TRAILER GUIDE DEVICE

(71) Applicant: Alfred Fangman, Batavia, OH (US)

(72) Inventor: Alfred Fangman, Batavia, OH (US)

( * ) Notice: Subject to any disclaimer, the term of this patent is extended or adjusted under 35 U.S.C. 154(b) by 0 days.

(21) Appl. No.: 19/386,365

(22) Filed: Nov. 12, 2025

(51) Int. Cl.
    B60P 3/10 (2006.01)
    B62D 63/08 (2006.01)

(52) U.S. Cl.
    CPC ............ B60P 3/1091 (2013.01); B62D 63/08 (2013.01)

(58) Field of Classification Search
    CPC ...... B60P 3/1066; B60P 3/1075; B60P 3/1091
    See application file for complete search history.

(56) References Cited

U.S. PATENT DOCUMENTS

| | | | | |
|---|---|---|---|---|
| 3,951,433 A | * | 4/1976 | Starkey | B60P 3/1066 |
| | | | | 280/414.1 |
| 4,103,925 A | | 8/1978 | Palamara | |
| 4,268,211 A | * | 5/1981 | Schwebke | B60P 3/1075 |
| | | | | 414/535 |
| 4,623,161 A | * | 11/1986 | Sprague | B60P 3/1075 |
| | | | | 114/344 |
| 5,195,767 A | * | 3/1993 | Des Roches | B60P 3/1075 |
| | | | | D34/28 |
| 6,904,861 B1 | * | 6/2005 | Warner | B60P 3/1075 |
| | | | | 114/344 |

| | | | | |
|---|---|---|---|---|
| 7,179,041 B2 | * | 2/2007 | Ebbenga | B60P 3/1075 |
| | | | | 414/494 |
| 7,896,382 B2 | | 3/2011 | Heck | |
| 8,006,995 B2 | | 8/2011 | Caudill | |
| 8,256,789 B2 | * | 9/2012 | Bryant, II | B60P 3/1075 |
| | | | | 414/532 |
| 10,583,768 B2 | * | 3/2020 | Thorley | B60P 1/00 |
| 10,730,425 B2 | * | 8/2020 | Yanyk | B60P 3/1075 |
| D936,523 S | | 11/2021 | Reynolds | |
| 11,648,868 B1 | * | 5/2023 | Tishenko | B60P 3/1066 |
| | | | | 280/414.3 |
| 11,745,637 B1 | * | 9/2023 | Isley, III | B60P 3/1075 |
| | | | | 280/414.1 |
| 2010/0283224 A1 | | 11/2010 | Allen | |

FOREIGN PATENT DOCUMENTS

CA        2964925        10/2017

* cited by examiner

*Primary Examiner* — Minnah L Seoh
*Assistant Examiner* — Hosam Shabara

(57) ABSTRACT

A boat trailer guide device for guiding a boat onto a boat trailer includes a boat trailer that has a frame and a pair of hull bunks each coupled to the frame to support a hull of a boat when the boat is positioned on the boat trailer. A plurality of poles is coupled to and extends upwardly from the boat trailer. Each pole is spaced outwardly from a respective one of the pair of hull bunks such that each pole of is spaced from the hull of the boat when the boat is positioned on the boat trailer. A first rope extends through respective ones of the plurality of poles to guide the boat onto the boat trailer. A second rope extends through respective ones of the plurality of poles to guide the boat onto the boat trailer.

16 Claims, 7 Drawing Sheets

BOAT TRAILER GUIDE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to boat trailer devices and more particularly pertains to a new boat trailer device for guiding a boat onto a boat trailer. The device includes a boat trailer and a plurality of poles each extending upwardly from the boat trailer.

Additionally, the device includes a first rope which extends through respective ones of the plurality of poles to guide the boat onto the boat trailer. The device includes a second rope which extends through respective ones of the plurality of poles to guide the boat onto the boat trailer.

(2) Description of Related Art Including Information Disclosed Under 37 CFR 1.97 and 1.98

The prior art relates to boat trailer devices including: a variety of boat trailer devices that each at includes a boat trailer and a plurality of rigid guides which are each coupled to the boat trailer to guide a boat onto the boat trailer; a boat trailer device that includes a boat trailer which has a plurality of guides which are oriented at an angle on the boat trailer such that the guides are aligned with a water line when the boat trailer is backed into the water. In no instance does the prior art disclose a boat trailer guide device that includes a boat trailer and a plurality of poles each coupled to and extending upwardly from the boat trailer and a first rope which extends through respective poles to guide a boat onto the boat trailer and a second rope which extends through respective poles to guide the boat onto the boat trailer.

BRIEF SUMMARY OF THE INVENTION

An embodiment of the disclosure meets the needs presented above by generally comprising a boat trailer that has a frame and a pair of hull bunks each coupled to the frame to support a hull of a boat when the boat is positioned on the boat trailer. A plurality of poles is coupled to and extends upwardly from the boat trailer. Each pole is spaced outwardly from a respective one of the pair of hull bunks such that each pole of is spaced from the hull of the boat when the boat is positioned on the boat trailer. A first rope extends through respective ones of the plurality of poles to guide the boat onto the boat trailer. A second rope extends through respective ones of the plurality of poles to guide the boat onto the boat trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
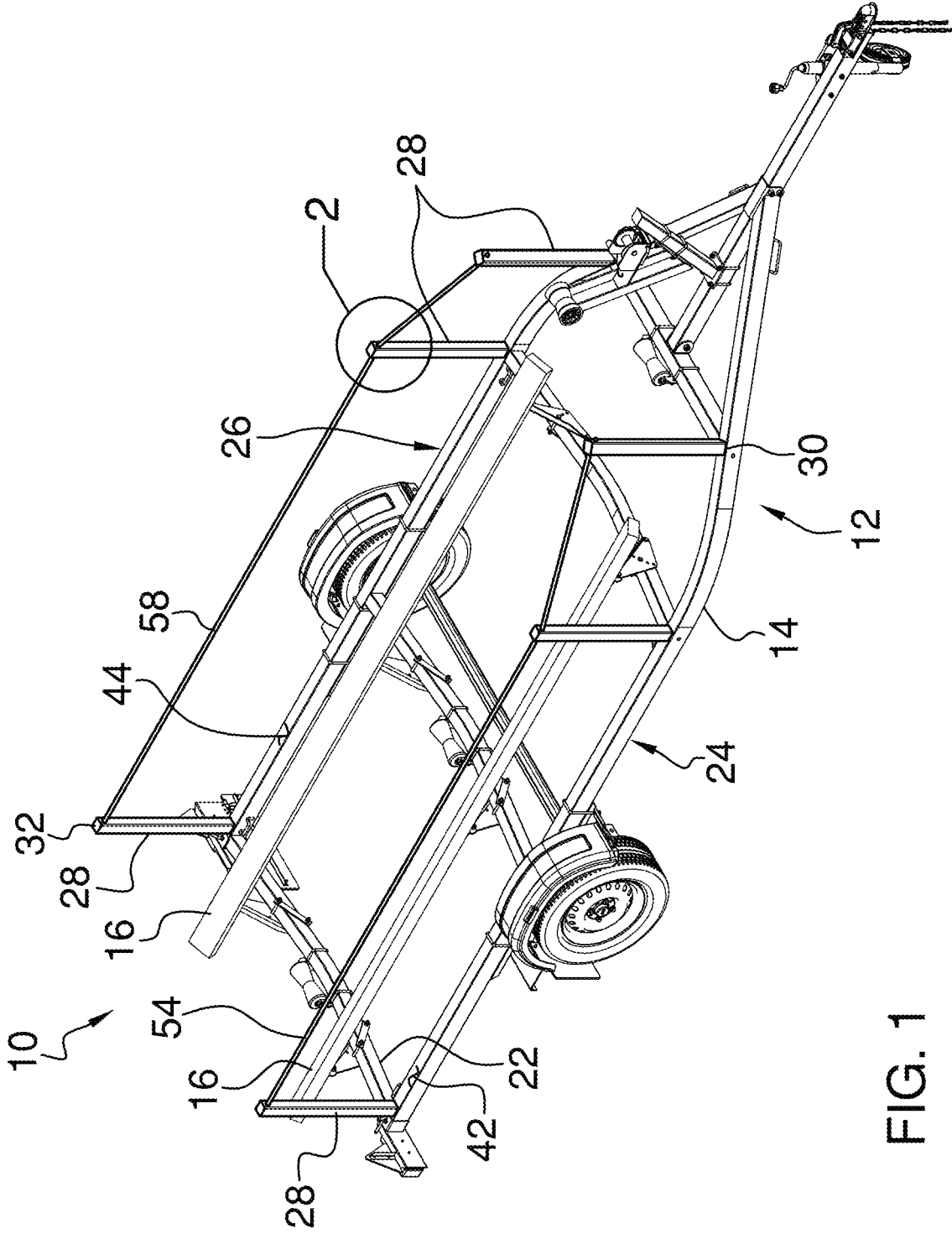
FIG. 1 is a top perspective view of a boat trailer guide device according to an embodiment of the disclosure.
Figure 2:
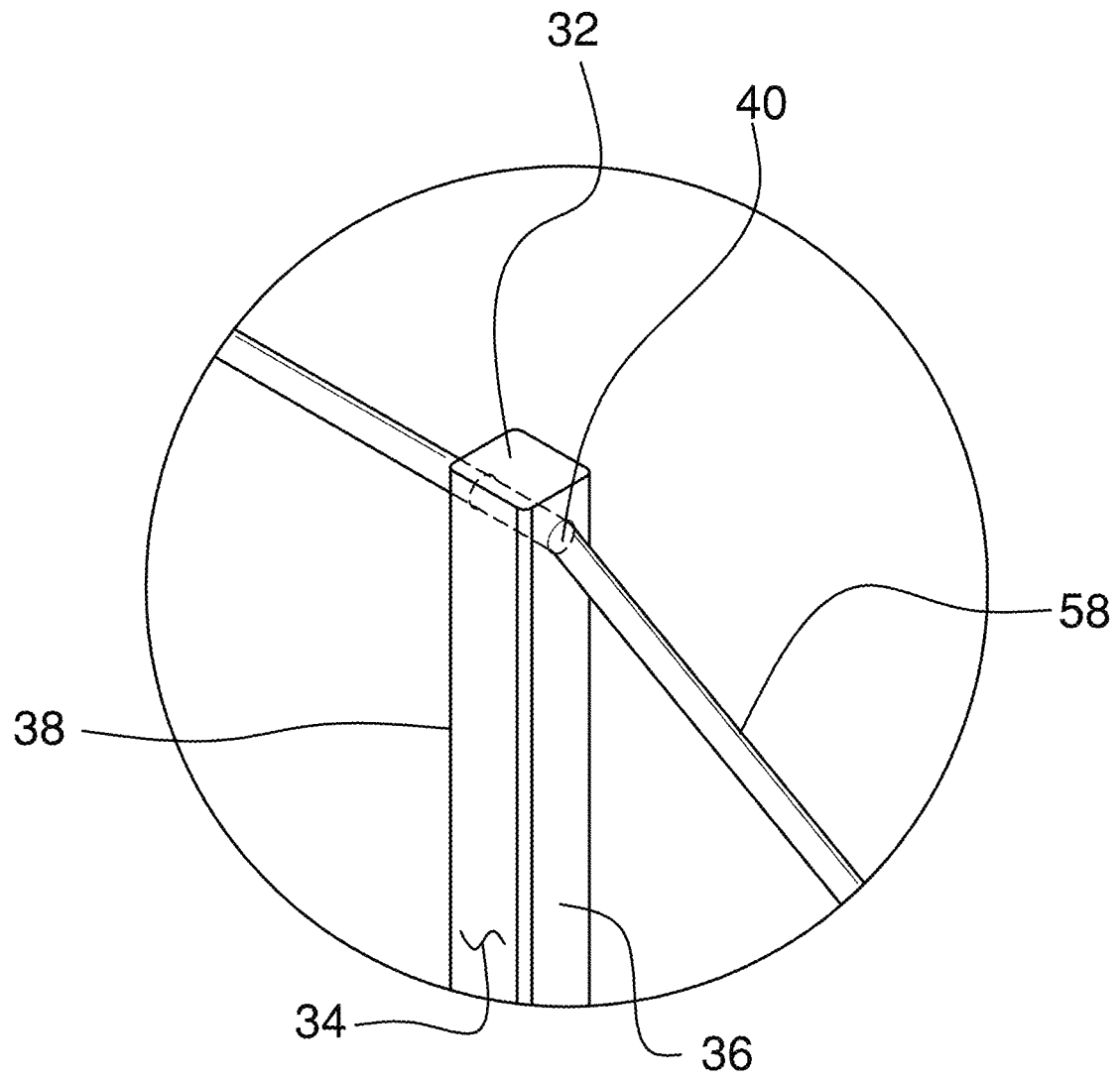
FIG. 2 is a magnified detail view taken from circle 2 of FIG. 1 of an embodiment of the disclosure.
Figure 3:
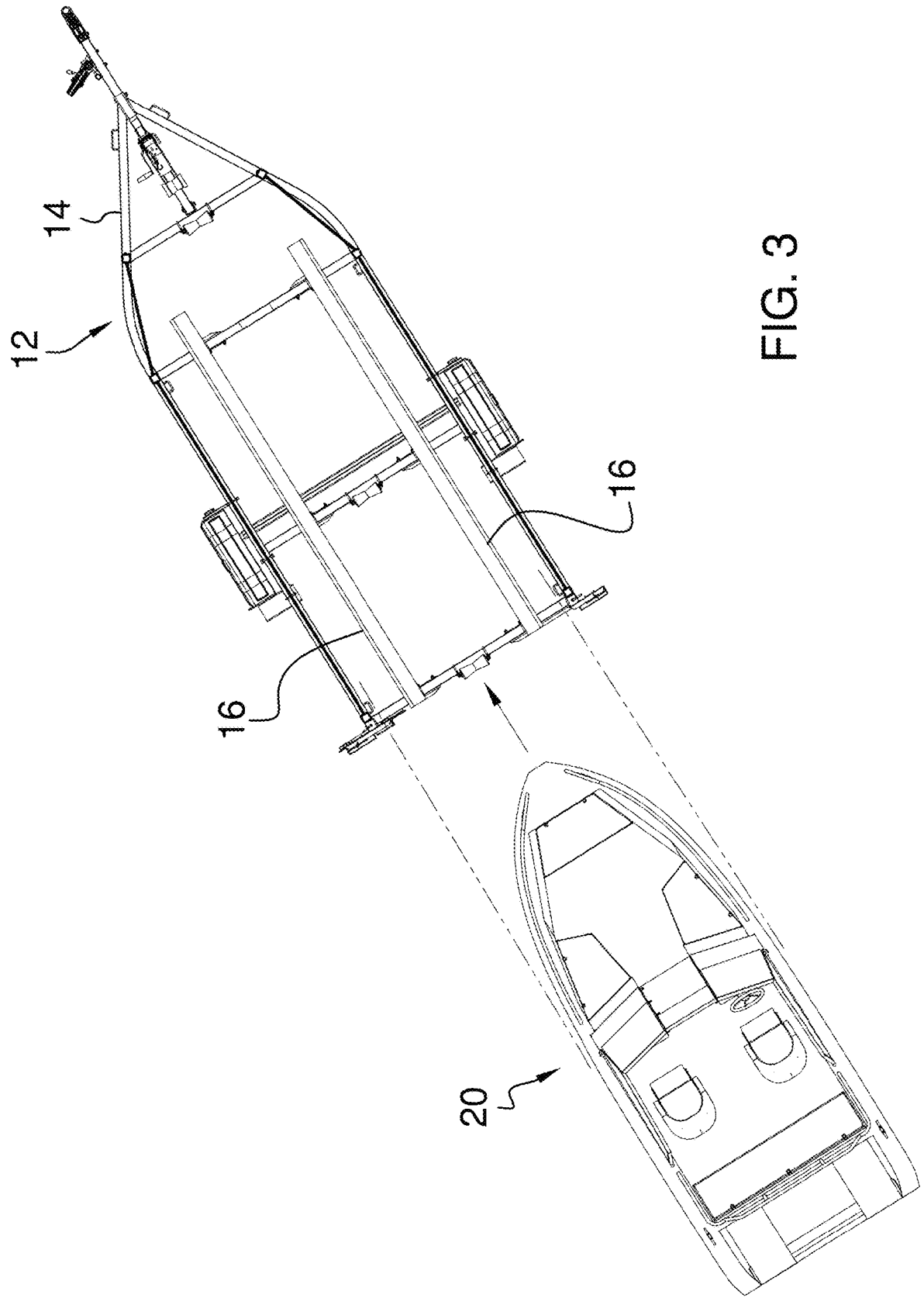
FIG. 3 is a top view of an embodiment of the disclosure showing a boat being driven onto a boat trailer.
Figure 4:
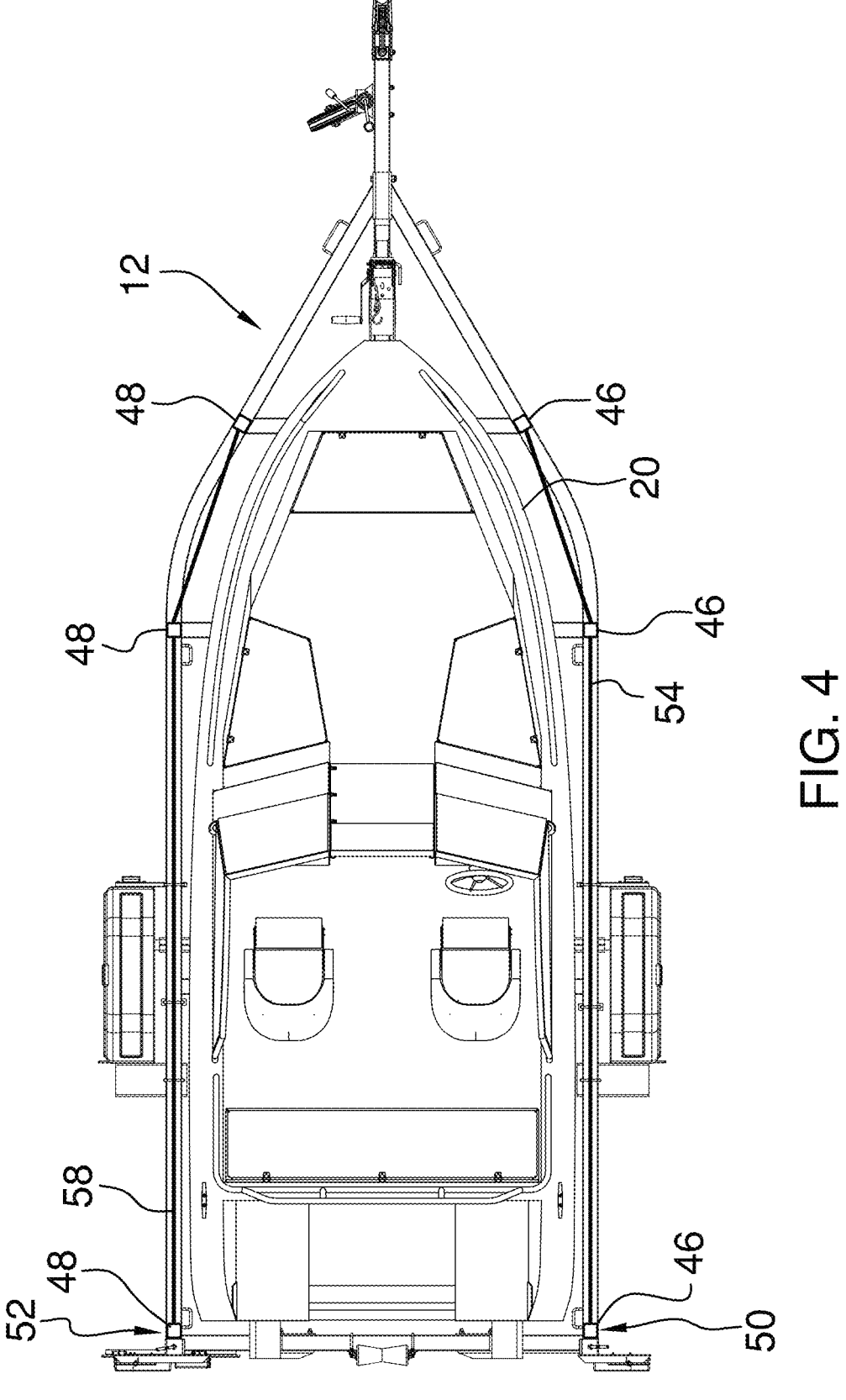
FIG. 4 is a top view of an embodiment of the disclosure showing a boat being positioned on a boat trailer.
Figure 5:
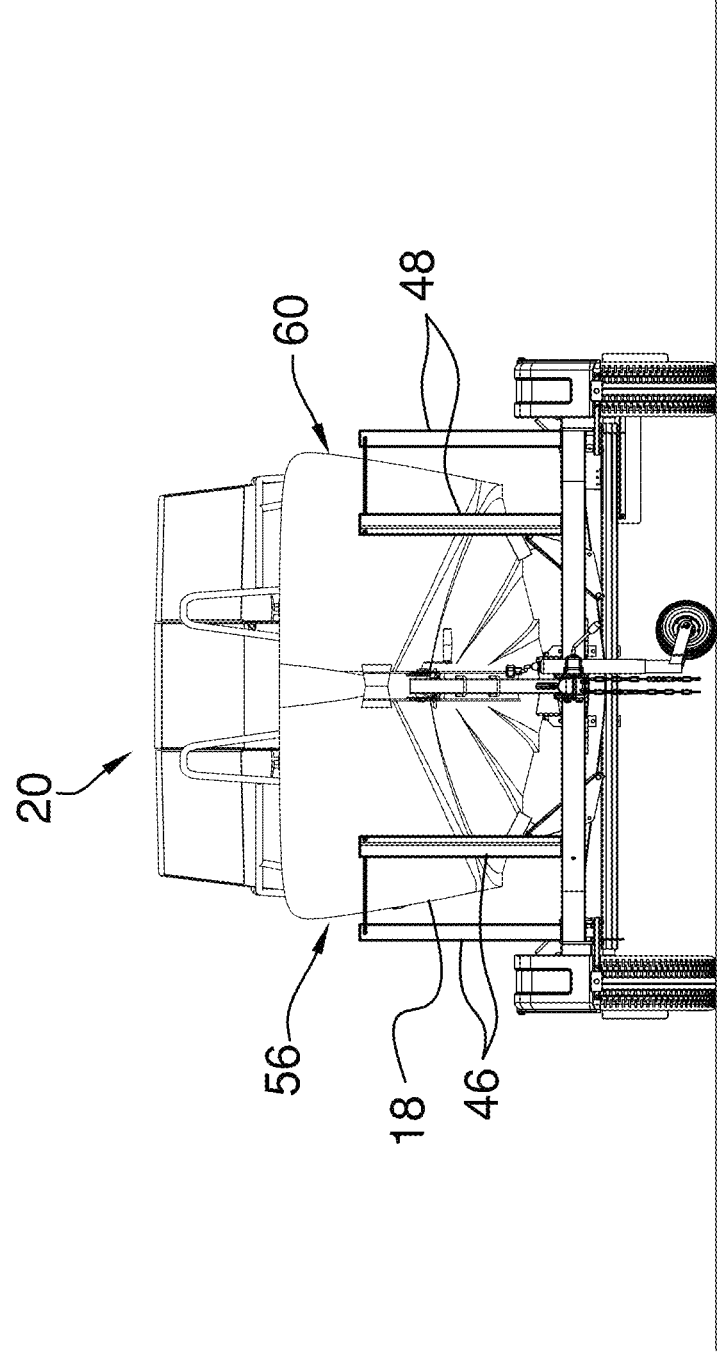
FIG. 5 is a front view of an embodiment of the disclosure showing a boat being positioned on a boat trailer.
Figure 6:
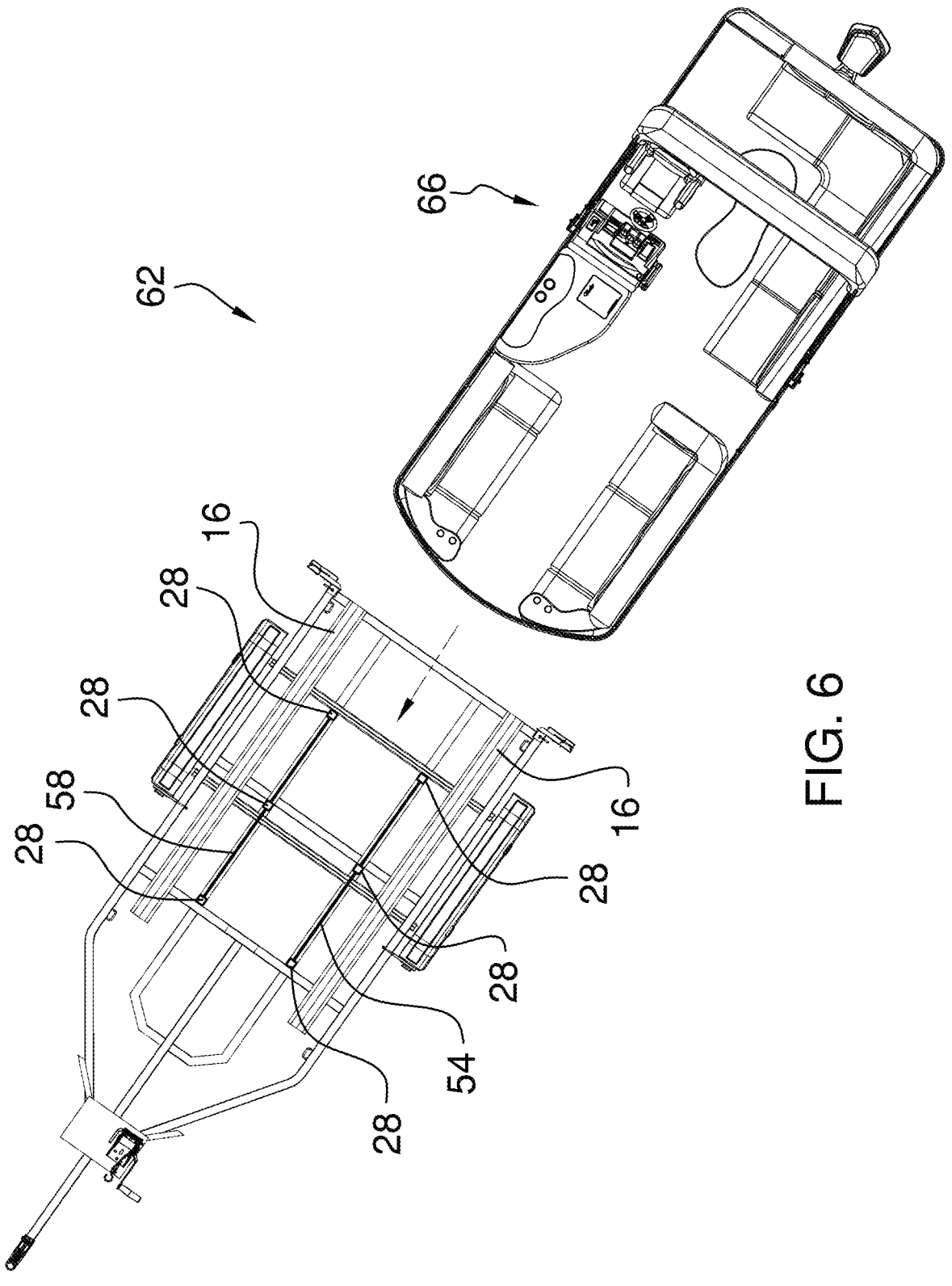
FIG. 6 is a top view of an alternative embodiment of the disclosure showing a tritoon boat being driven onto a boat trailer.
Figure 7:
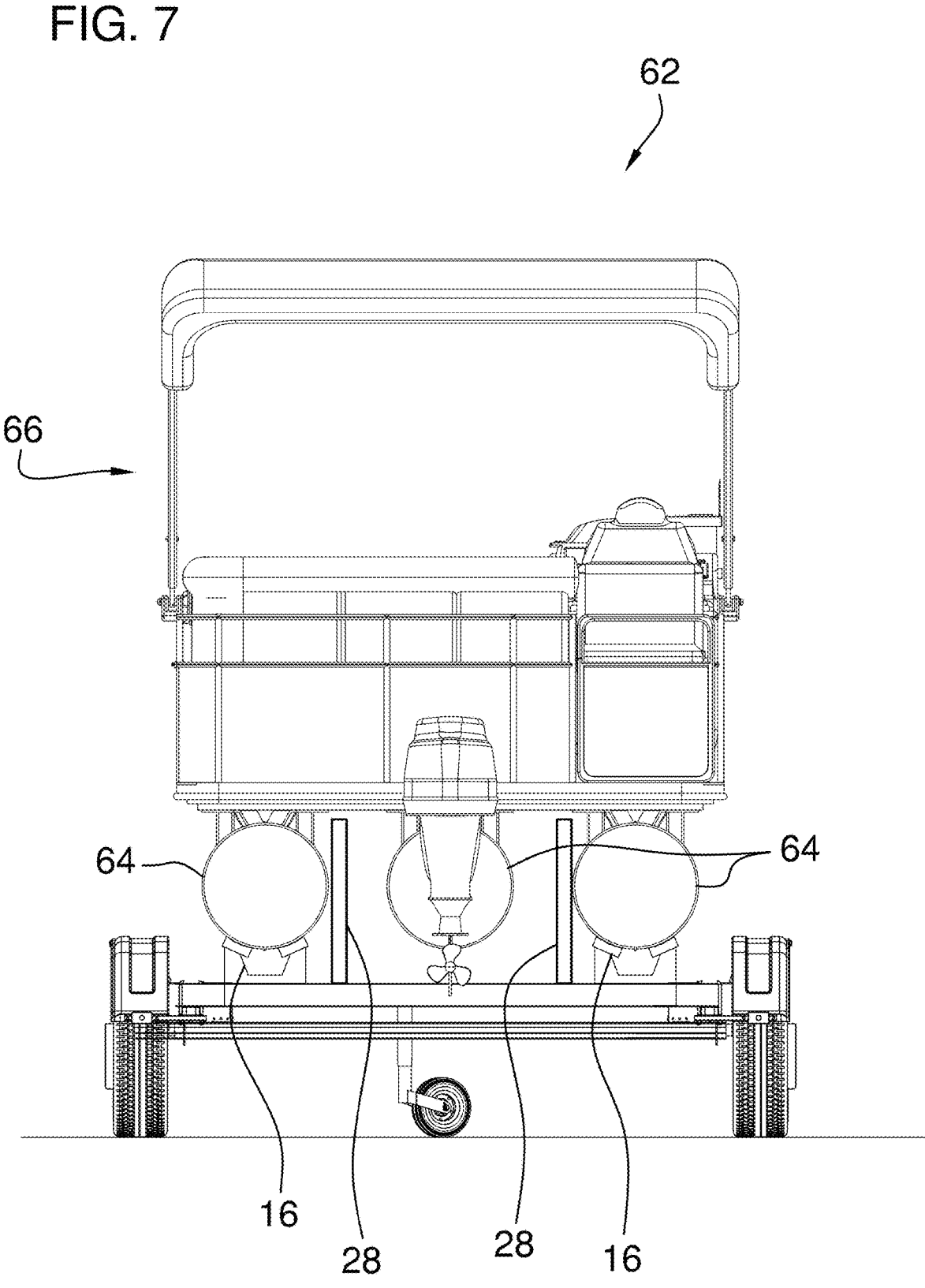
FIG. 7 is a back view of an alternative embodiment of the disclosure showing a tritoon boat being positioned on a boat trailer.

With reference now to the drawings, and in particular to FIGS. 1 through 7 thereof, a new boat trailer device embodying the principles and concepts of an embodiment of the disclosure and generally designated by the reference numeral 10 will be described.

As best illustrated in FIGS. 1 through 7, the boat trailer guide device 10 generally comprises a boat trailer 12 that has a frame 14 and a pair of hull bunks 16 each coupled to the frame 14. Each hull bunk 16 of the pair of hull bunks 16 supports a hull 18 of a boat 20 when the boat 20 is positioned on the boat trailer 12. The boat 20 may be a V-hull boat of any conventional design that is commonly transported on a boat trailer. Furthermore, the boat trailer 12 may be a boat trailer of any conventional design, including but not being limited to a runabout or a cruiser, that is commonly employed to transport boats.

The frame 14 has a rear member 22 extending between a first outward member 24 and a second outward member 26. Additionally, the rear member 22 is oriented perpendicular to each of the first outward member 24 and the second outward member 26. Each hull bunk 16 of the pair of hull bunks 16 is oriented parallel with a respective one of the first outward member 24 and the second outward member 26. Additionally, each hull bunk 16 of the pair of hull bunks 16 is spaced inwardly from a respective one of the first outward member 24 and the second outward member 26.

A plurality of poles 28 is provided and each pole 28 of the plurality of poles 28 is coupled to and extends upwardly from the boat trailer 12. Each pole 28 of the plurality of poles 28 is spaced outwardly from a respective one of the pair of hull bunks 16. Furthermore, each pole 28 of the plurality of poles 28 is spaced from the hull 18 of the boat 20 when the boat 20 is positioned on the boat trailer 12. Each pole 28 of the plurality of poles 28 has a lower end 30 and an upper end 32 and an outer surface 34 extending between the lower end 30 of a respective pole 28 and the upper end 32 of a respective pole 28. The outer surface 34 of each pole 28 of the plurality of poles 28 has a front side 36 and a back side 38. Additionally, each pole 28 of the plurality of poles 28 has a hole 40 extending through the front side 36 and the back side 38 of the outer surface 34 of a respective pole 28. Furthermore, the hole 40 in a respective pole 28 is positioned closer to the upper end 32 of the respective pole 28 than the lower end 30 of the respective pole 28.

The first outward member 24 of the frame 14 of the boat trailer 12 has a top surface 42 and the second outward member 26 of the frame 14 of the boat trailer 12 has a top surface 44 of the second outward member 26. The plurality of poles 28 includes a set of first poles 46 and a second of second poles 48. The lower end 30 of each first pole 46 of the set of first poles 46 is coupled to the top surface 42 of the first outward member 24. In addition, the set of first poles 46 is spaced apart from each other and is distributed along the top surface 42 of the first outward member 24. Furthermore, the set of first poles 46 includes a rearmost pole 50 and the rearmost pole 50 is positioned adjacent to an intersection between the first outward member 24 and the rear member 22 of the boat trailer 12.

The lower end 30 of each second pole 48 of the set of second poles 48 is coupled to the top surface 44 of the second outward member 26. Additionally, the set of second poles 48 is spaced apart from each other and is distributed along the top surface 44 of the second outward member 26. The set of second poles 48 includes a rearmost pole 52 of the set of second poles 48. Furthermore, the rearmost pole 52 of the set of second poles 48 is positioned adjacent to an intersection between the second outward member 26 and the rear member 22 of the boat trailer 12.

A first rope 54 extends through respective ones of the plurality of poles 28 to guide the boat 20 onto the boat trailer 12. The first rope 54 extends through the hole 40 in each first pole 46 of the set of first poles 46 such that the first rope 54 extends along a first lateral side 56 of the hull 18 of the boat 20. Additionally, the first rope 54 is comprised of an elastomeric material such that the first rope 54 can resist damaging the hull 18 of the boat 20. A second rope 58 extends through respective ones of the plurality of poles 28 to guide the boat 20 onto the boat trailer 12. The second rope 58 extends through the hole 40 in each second pole 48 of the set of second poles 48 such that the second rope 58 extends along a second lateral side 60 of the hull 18 of the boat 20. Additionally, the second rope 58 is comprised of an elastomeric material such that the second rope 58 can resist damaging the hull 18 of the boat 20. In an alternative embodiment 62 shown in FIGS. 6 and 7, each pole 28 of the plurality of poles 28 is positioned between a respective pair of hull bunks 16. Furthermore, the poles 28 may be spaced apart a distance of approximately 66.0 cm with respect to the width of the boat trailer 12. Furthermore, each of the first rope 54 and the second rope 58 are positioned between respective tritoons 64 of a tritoon boat 66 when the tritoon boat 66 is driven onto the boat trailer 12.

In use, the boat 20 is driven onto the boat trailer 12 such that the hull 18 of the boat 20 slides along each hull bunk 16 of the pair of hull bunks 16. Each of the first rope 54 and the second rope 58 restricts lateral movement of the boat 20 while the boat 20 is being driven onto the boat trailer 12. Consequently the boat 20 is centered on the boat trailer 12 to ensure that the boat 20 is properly positioned on the boat trailer 12 for transporting the boat 20. Furthermore, the elastomeric material of which each of the first rope 54 and the second rope 58 are comprised inhibits the hull 18 of the boat 20 from being damaged from contact with the first rope 54 or the second rope 58.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A boat trailer guide device comprising:
   a boat trailer having a frame and a pair of hull bunks each coupled to said frame wherein each hull bunk of said pair of hull bunks is configured to support a hull of a boat when the boat is positioned on said boat trailer;
   a plurality of poles, each pole of said plurality of poles being coupled to and extending upwardly from said boat trailer, each pole of said plurality of poles being spaced outwardly from a respective one of said pair of hull bunks wherein each pole of said plurality of poles is configured to be spaced from the hull of the boat when the boat is positioned on said boat trailer;
   a first rope extending through respective ones of said plurality of poles wherein said first rope is configured to guide the boat onto said boat trailer;
   a second rope extending through respective ones of said plurality of poles wherein said second rope is configured to guide the boat onto said boat trailer;
   said frame of said boat trailer including a first outward member;
   said first outward member of said frame of said boat trailer having a top surface;

each pole of said plurality of poles having a lower end;
said plurality of poles including a set of first poles; and
said lower end of each first pole of said set of first poles
being coupled to said top surface of said first outward
member.

2. The boat trailer guide device according to claim 1, further comprising:
said frame having a rear member extending between a first outward member and a second outward member;
said rear member being oriented perpendicular to each of said first outward member and said second outward member; and
each hull bunk of said pair of hull bunks being oriented parallel with a respective one of said first outward member and said second outward member.

3. The boat trailer guide device according to claim 2, further comprising each hull bunk of said pair of hull bunks being spaced inwardly from a respective one of said first outward member and said second outward member.

4. The boat trailer guide device according to claim 1, further comprising said set of first poles being spaced apart from each other and being distributed along said top surface of said first outward member.

5. The boat trailer guide device according to claim 1, further comprising:
said frame of said boat trailer including a rear member;
said set of first poles including a rearmost pole; and
said rearmost pole being positioned adjacent to an intersection between said first outward member and said rear member of said boat trailer.

6. The boat trailer guide device according to claim 1, further comprising said first rope being comprised of an elastomeric material wherein said first rope is configured to resist damaging the hull of the boat.

7. The boat trailer guide device according to claim 1, further comprising said second rope being comprised of an elastomeric material wherein said second rope is configured to resist damaging the hull of the boat.

8. The boat trailer guide device of claim 1, further comprising:
said frame having a rear member extending between said first outward member and a second outward member, said rear member being oriented perpendicular to each of said first outward member and said second outward member, each hull bunk of said pair of hull bunks being oriented parallel with a respective one of said first outward member and said second outward member, each hull bunk of said pair of hull bunks being spaced inwardly from a respective one of said first outward member and said second outward member;
each pole of said plurality of poles having an upper end and an outer surface extending between said lower end of a respective pole and said upper end of a respective pole, said outer surface of each pole of said plurality of poles having a front side and a back side, each pole of said plurality of poles having a hole extending through said front side and said back side of said outer surface of a respective pole, said hole in a respective pole being positioned closer to said upper end of said respective pole than said lower end of said respective pole, said second outward member of said frame of said boat trailer having a top surface of said second outward member, said plurality of poles including a set of second poles, said set of first poles being spaced apart from each other and being distributed along said top surface of said first outward member, said set of first poles including a rearmost pole, said rearmost pole being positioned adjacent to an intersection between said first outward member and said rear member of said boat trailer, said lower end of each second pole of said set of second poles being coupled to said top surface of said second outward member, said set of second poles being spaced apart from each other and being distributed along said top surface of said second outward member, said set of second poles including a rearmost pole of said set of second poles, said rearmost pole of said set of second poles being positioned adjacent to an intersection between said second outward member and said rear member of said boat trailer;
said first rope extending through said hole in each first pole of said set of first poles wherein said first rope is configured to extend along a first lateral side of the hull of the boat, said first rope being comprised of an elastomeric material wherein said first rope is configured to resist damaging the hull of the boat; and
said second rope extending through said hole in each second pole of said set of second poles wherein said second rope is configured to extend along a second lateral side of the hull of the boat, said second rope being comprised of an elastomeric material wherein said second rope is configured to resist damaging the hull of the boat.

9. The device according to claim 8, further comprising each pole of said plurality of poles being positioned between said pair of hull bunks wherein each of said first rope and said second rope are configured to be positioned between respective tritoons of a tritoon boat when the tritoon boat is driven onto said boat trailer.

10. A boat trailer guide device comprising:
a boat trailer having a frame and a pair of hull bunks each coupled to said frame wherein each hull bunk of said pair of hull bunks is configured to support a hull of a boat when the boat is positioned on said boat trailer;
a plurality of poles, each pole of said plurality of poles being coupled to and extending upwardly from said boat trailer, each pole of said plurality of poles being spaced outwardly from a respective one of said pair of hull bunks wherein each pole of said plurality of poles is configured to be spaced from the hull of the boat when the boat is positioned on said boat trailer;
a first rope extending through respective ones of said plurality of poles wherein said first rope is configured to guide the boat onto said boat trailer;
a second rope extending through respective ones of said plurality of poles wherein said second rope is configured to guide the boat onto said boat trailer;
each pole of said plurality of poles having a lower end and an upper end and an outer surface extending between said lower end of a respective pole and said upper end of a respective pole;
said outer surface of each pole of said plurality of poles having a front side and a back side; and
each pole of said plurality of poles having a hole extending through said front side and said back side of said outer surface of a respective pole.

11. The boat trailer guide device according to claim 10, further comprising said hole in a respective pole being positioned closer to said upper end of said respective pole than said lower end of said respective pole.

12. The boat trailer guide device according to claim 10, further comprising:
said plurality of poles including a set of first poles; and said first rope extending through said hole in each first pole of said set of first poles wherein said first rope is configured to extend along a first lateral side of the hull of the boat.

13. The boat trailer guide device according to claim 10, further comprising:

said plurality of poles including a set of first poles;

said plurality of poles including a set of second poles; and said second rope extending through said hole in each second pole of said set of second poles wherein said second rope is configured to extend along a second lateral side of the hull of the boat.

14. A boat trailer guide device comprising:

a boat trailer having a frame and a pair of hull bunks each coupled to said frame wherein each hull bunk of said pair of hull bunks is configured to support a hull of a boat when the boat is positioned on said boat trailer;

a plurality of poles, each pole of said plurality of poles being coupled to and extending upwardly from said boat trailer, each pole of said plurality of poles being spaced outwardly from a respective one of said pair of hull bunks wherein each pole of said plurality of poles is configured to be spaced from the hull of the boat when the boat is positioned on said boat trailer;

a first rope extending through respective ones of said plurality of poles wherein said first rope is configured to guide the boat onto said boat trailer;

a second rope extending through respective ones of said plurality of poles wherein said second rope is configured to guide the boat onto said boat trailer;

said frame of said boat trailer including a first outward member;

said frame of said boat trailer including a second outward member;

said second outward member of said frame of said boat trailer having a top surface of said second outward member;

each pole of said plurality of poles having a lower end;

said plurality of poles including a set of first poles;

said plurality of poles including a set of second poles; and said lower end of each second pole of said set of second poles being coupled to said top surface of said second outward member.

15. The boat trailer guide device according to claim 14, further comprising said set of second poles being spaced apart from each other and being distributed along said top surface of said second outward member.

16. The boat trailer guide device according to claim 14, further comprising:

said frame of said boat trailer including a rear member;

said set of second poles including a rearmost pole of said set of second poles; and said rearmost pole of said set of second poles being positioned adjacent to an intersection between said second outward member and said rear member of said boat trailer.

* * * * *